US012562161B2

(12) United States Patent
Mao et al.

(10) Patent No.: US 12,562,161 B2
(45) Date of Patent: Feb. 24, 2026

(54) AUTOMATED CONTENT HIGHLIGHTING BASED ON SPOKEN COMMANDS

(71) Applicant: International Business Machines Corporation, Armonk, NY (US)

(72) Inventors: Xiao Xia Mao, Shanghai (CN); Wei Jun Zheng, Shanghai (CN); Chun Hong Zheng, Beijing (CN); Fu Er Liu, Shanghai (CN); Danlei Zhang, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 18/101,217

(22) Filed: Jan. 25, 2023

(65) Prior Publication Data

US 2024/0249721 A1     Jul. 25, 2024

(51) Int. Cl.
G10L 15/26          (2006.01)
G10L 15/06          (2013.01)
G10L 15/22          (2006.01)

(52) U.S. Cl.
CPC ............ G10L 15/22 (2013.01); G10L 15/063 (2013.01); G10L 15/26 (2013.01)

(58) Field of Classification Search
None
See application file for complete search history.

(56) References Cited

U.S. PATENT DOCUMENTS 8,045,861 B1 * 10/2011 Efimov .............. H04B 10/6972
                                                                   398/208
10,649,728 B2     5/2020 Stout
(Continued)

FOREIGN PATENT DOCUMENTS

CN          101996195 B     7/2012
CN          101901622 B     8/2012
(Continued)

OTHER PUBLICATIONS

Eliason, Nat, "How to Make Podcast Listening Productive with Audio Highlighting", https://www.nateliason.com/blog/podcast-highlighting-airr-readwise, Published or Updated on Aug. 26, 2020, 10 pages.

(Continued)

*Primary Examiner* — Neeraj Sharma
(74) *Attorney, Agent, or Firm* — Harrity & Harrity, LLP

(57)          ABSTRACT
A machine learning (ML) computer model is trained on a dual-modal input sequence comprising target content data and an input user query specifying attributes for locating a portion within the target content data. The ML computer model is trained to process the dual-modal input sequence and output an output text specifying start and end indices, within the target content data, corresponding to the portion. Runtime content data, and a user spoken query, are received and the runtime content data and user spoken query are processed via the trained ML computer model to generate an output text specifying a predicted beginning index and predicted ending index within the runtime content data. The portion of the runtime content data corresponding to a range of runtime content data bounded by the beginning index and ending index, inclusively, is retrieved and stored for later retrieval and processing.

20 Claims, 6 Drawing Sheets

(56) References Cited

U.S. PATENT DOCUMENTS

| | | | | |
|---|---|---|---|---|
| 10,999,636 | B1 * | 5/2021 | Kim | G10L 15/08 |
| 2005/0091062 | A1 * | 4/2005 | Burges | G11B 27/28 |
| | | | | 704/273 |
| 2005/0249080 | A1 * | 11/2005 | Foote | G06F 16/639 |
| 2007/0112837 | A1 * | 5/2007 | Houh | G06F 16/489 |
| | | | | 707/E17.02 |
| 2009/0006308 | A1 * | 1/2009 | Fonsen | G06F 16/9574 |
| 2013/0304871 | A1 * | 11/2013 | Silverman | H04L 67/10 |
| | | | | 709/219 |
| 2016/0034430 | A1 * | 2/2016 | Beavers | G06F 3/0483 |
| | | | | 715/205 |
| 2016/0247328 | A1 | 8/2016 | Han et al. | |
| 2017/0169827 | A1 | 6/2017 | Barreira Avegliano et al. | |
| 2017/0270415 | A1 * | 9/2017 | Kemp | G06Q 30/0251 |
| 2019/0155955 | A1 * | 5/2019 | Castaneda | G06F 16/335 |
| 2021/0142066 | A1 * | 5/2021 | Jayaram | G02B 3/005 |
| 2022/0148615 | A1 * | 5/2022 | Majors | G06F 9/44526 |
| 2022/0189173 | A1 | 6/2022 | Zhou et al. | |
| 2022/0284904 | A1 * | 9/2022 | Pu | G06F 40/35 |

FOREIGN PATENT DOCUMENTS

| | | | |
|---|---|---|---|
| KR | 20040050574 | A | 6/2004 |
| KR | 20140112313 | A | 9/2014 |
| WO | WO2013/176365 | A1 | 11/2013 |

OTHER PUBLICATIONS

Otsuka, Isao et al., "A Highlight Scene Detection and Video Summarization System using Audio Feature for a Personal Video Recorder", IEEE Transactions on Consumer Electronics, vol. 51, No. 1, Feb. 2005, 5 pages.

Breitman Kendall "Podcast Statistics and Trends for 2025 (& Why They Matter)", Jan. 31, 2025, 09 pages, https://riverside.com/blog/podcast-statistics.

Dai et al., "Transformer-XL: Attentive Language Models Beyond a Fixed-Length Context", arXiv: 1901.02860v3 [cs.LG], Jun. 2, 2019, 20 pages.

Oord et al., "Neural Discrete Representation Learning", arXiv: 1711.00937v2 [cs.LG], May 30, 2018, 11 pages.

* cited by examiner

AUTOMATED CONTENT HIGHLIGHTING BASED ON SPOKEN COMMANDS

BACKGROUND

The present application relates generally to an improved data processing apparatus and method and more specifically to an improved computing tool and improved computing tool operations/functionality for automatically highlighting content of digital pre-recorded content data based on spoken commands.

With increased usage of digital media, many people obtain entertainment and information via digital pre-recordings of content, e.g., podcasts, audio books, pre-recorded news audio, etc. which are downloaded to a computing device for playback through a computer application. Often times, people consume the content of these digital pre-recordings while multi-tasking with other daily activities. For example, people often listen to podcasts, audio books, and the like, while performing other activities such as driving, working, performing household chores or activities, performing physical activities at the gym, or the like, where the other activities they are engaged in do not permit the person to manually and physically manipulate the computing devices or user interfaces of the application through which the content is being provided. For example, while driving, it is unsafe for a person to manipulate their handheld device to interact with the application through which a podcast or audio book is being played. This poses an issue when the person wishes to highlight certain content in the digital media, such as identifying a portion of the pre-recording to return to later, re-play a portion of the pre-recording, or the like.

Many podcast services or applications allow the provider of the podcast, i.e., the "host", to create clickable timestamps to link directly to a timeslot of the audio content. However, such clickable timestamps are defined by the host and not the end user, and still require manual and physical interaction between the end user and the computing device/user interface to select, or "click", the clickable timestamps. This is not feasible in situations where the end user cannot operate the devices timely when their hands are otherwise occupied and the end user does not want to, or cannot, stop their current activity to focus on the audio playback computing device. Moreover, it may be difficult, at a later time, for the end user to go back and capture the particular timeslot that the user is interested in once the user is able to manipulate the audio playback computing device. In addition, if the user must wait until a later time when their activity is complete and they can manipulate the audio playback computing device, they may have forgotten which audio content they heard and wanted to go back to.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method is provided that comprises training a machine learning computer model on a dual-modal input sequence comprising target content data and an input user query specifying attributes for locating a portion within the target content data. The machine learning computer model is trained to process the dual-modal input sequence and output an output text specifying start and end indices, within the target content data, corresponding to the portion within the target content data. The method further comprises receiving runtime content data and a user spoken query comprising attributes directed to identifying a section of the runtime content data, and processing the runtime content data and user spoken query via the trained machine learning computer model to generate an output text specifying a predicted beginning index and predicted ending index within the runtime content data. The method also comprises retrieving a portion of the runtime content data corresponding to a range of runtime content data bounded by the beginning index and ending index, inclusively, and storing the retrieved portion in a data storage for later retrieval and processing.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
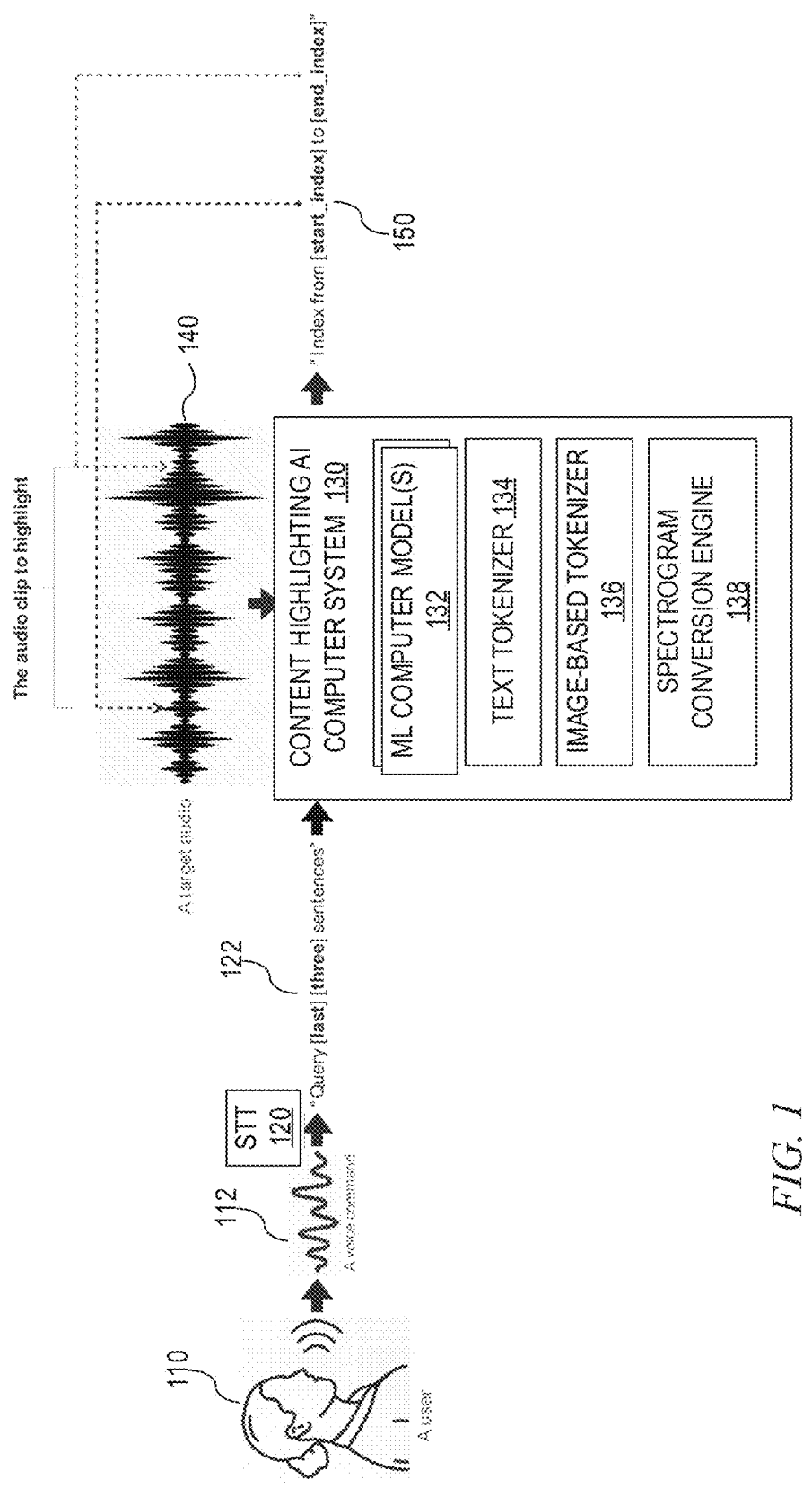
FIG. 1 is an example diagram illustrating an example operation of a content highlighting AI computer system in accordance with one illustrative embodiment.

When consuming pre-recorded digital audio/video content, such as in the case of podcasts, digital audio books, or the like, individuals often hear content, e.g., fresh ideas, information they did not previously have, or even just content of particular interest to them, that they wish to take note of or otherwise be able to access or review at a later time. However, as such pre-recorded content is often listened to while individuals are engaged in other activities, it may be difficult or not possible for individuals to take such notes or otherwise mark the portions of content that are of particular interest to the individual. For example, if a person is driving and listening to a podcast, performing housework, or otherwise engaged in an activity that requires occupation of the person's hands, it may not be possible, or it may be unsafe, for the person to manipulate the playback computing device that is being used to listen to the pre-recorded digital audio/video content. Moreover, even in cases where the pre-recorded digital audio/video content is marked with host specified clickable timestamps, the interaction to access the clickable timestamps may not be possible due to the other activities the individual is engaged in.

Thus, there is a need for a new mechanism for allowing an individual to mark portions of pre-recorded digital audio/video content without requiring physical manipulation of the playback computing device, and in a dynamic manner without requiring host specified clickable timestamps. The illustrative embodiments provide an artificial intelligence based improved computing tool that facilitates identification of the bounds of a portion of content of interest to an individual, i.e., a portion of content to highlight, based on their spoken queries or commands. The illustrative embodiments automatically, through artificial intelligence comprising a machine learning trained computer model, locate the specific time range in the pre-recorded digital content that is of interest to the individual and automatically converts the content to a highlight data structure, e.g., multi-media snippet, textual conversion of audio content, and/or the like, so that the highlighted content may be stored as a customized selection of a portion of the pre-recorded digital content for later access by the individual.

While the illustrative embodiments will be described in the context of pre-recorded digital audio content, such as podcasts or digital audio books, it should be appreciated that the illustrative embodiments are applicable to any pre-recorded digital content, comprising audio and/or video. Thus, while the illustrative embodiments will be described in the context of audio data, finding time ranges within audio data that are of interest, and converting the audio to textual representations for storing and later retrieval, the illustrative embodiments are not limited to such and may in fact be applied to video and multi-media content, such that the time ranges may represent ranges in video and multi-media content, and the stored portions of content may comprise video, audio, converted text, and the like. The pre-recorded digital audio content is used as an example herein as it is often consumed by individuals while performing other activities which may require the occupation of their hands and split attention, such that the mechanisms of the illustrative embodiments are of even greater assistance and value to individuals in such situations.

With the mechanisms of the illustrative embodiments, taking pre-recorded digital audio data, such as a podcast or digital audio book, as an example, in order to highlight a portion of the content, a user need only speak a query/command and the artificial intelligence (AI) mechanisms of the illustrative embodiments automatically determine the beginning and end timestamps of the highlighted audio clip that the user wishes to capture. The query/command spoken by the user may be a templated query/command which is then converted to a templated output textual command specifying the automatically determined timestamps. The templated output textual command may then be used to select the corresponding portion of content within the specified timestamps, which may then be stored for later retrieval, playback, or review. Moreover, the selected portion of content may be converted to a textual format for automated generation of textual notes. In some illustrative embodiments, the illustrative embodiments may be trained and configured to identify content types, e.g., different musical genres or the like, and may automatically identify portions of content corresponding to content types.

It should be appreciated that the illustrative embodiments do not rely on any text version of the pre-recorded digital audio data or the highlighted audio portion, i.e., the illustrative embodiments do not require speech to text conversion in order to operate, but may apply such speech to text conversion after the highlighted audio portion is obtained, if desired. Instead, the pre-recorded digital audio data is converted to a spectrogram which is then separated into chunks of spectrogram data, where each chunk corresponds to a particular portion of time in the spectrogram. The artificial intelligence (AI) mechanisms of the illustrative embodiments learn correlations between user specified commands and which chunks in the spectrogram correspond to the user specified command attributes, e.g., the specified content type, keywords, time scope, number of textual elements, e.g., terms, sentences, or the like. In this way, the AI mechanisms, given a new user command and a spectrogram of digital audio data, may determine the start and end bounds of the portion of the digital audio data the user is wanting to highlight and automatically extract that portion from the digital audio data based on the corresponding spectrogram. This extracted portion may then be subjected to further processing, such as audio-to-text conversion, storage for later retrieval, and the like.

In one illustrative embodiment, the user commands that the AI mechanism of the illustrative embodiments operate on, are predetermined templated text sentences used for the input and output of the machine learning trained computer model(s) of the AI mechanism, hereafter referred to as the ML computer model(s). For example, in some illustrative embodiments four templated text sentences are used for the input and output of the ML computer model(s). Three of these templated text sentences may be used to provide a user's command and specify the attributes of the command (or query) for finding an desired audio clip in the audio data, while one of these templated text sentences may be output to specify the bounds of the audio clip as determined by the ML computer model(s) and the training of these ML computer model(s) to correlate patterns of user command attributes with spectrogram chunks in a spectrogram of audio data.

For example, in some illustrative embodiments, users may speak commands such as "Query [last|current] [content_type]", "Query [N] sentences centered on [keyword] in [last|current][content_type]", and "Query [last|current][N] sentences", where the bracketed attributes are those attributes that are extracted from the user's spoken command, through speech-to-text conversion of the spoken command and then textual feature extraction, and which are used as an input pattern for correlation with start and end spectrogram chunks. It should be appreciated that these are only examples of spoken commands that may be utilized, and many modifications may be made to these commands without departing from the spirit and scope of the present invention. In fact, a user may define their own spoken commands that replace or augment those described above, such that each user may have their own custom set of commands for specifying the attributes for identifying the bounds of a desired audio clip, e.g., "Get the [last|current] [N] sentences". In addition, while examples will be provided with regard to the last/current number of sentences and being centered around keywords and content types, the illustrative embodiments are not limited to such and other attributes that may be correlated with start/end chunks of a spectrogram of audio content may be utilized without departing from the spirit and scope of the present invention. For example, rather than sentences, the illustrative embodiments may operate on a number of words, paragraphs, etc. Instead of operating on keywords, the illustrative embodiments may operate on phrases or other portions of text.

In some illustrative embodiments, the ML computer model(s) take in a dual-modal input sequence comprising, in a first mode, a templated text sentence (converted from a user's voice command through speech-to-text) which includes content type, keyword, time scope (e.g., "last" or "current"), and the number of sentences that a user can use to locate an expected audio clip in a target audio. The dual-modal input sequence further comprises, in a second mode, a target audio (containing an audio clip to be highlighted) which is converted to a spectrogram and then divided into chunks, where each chunk has a same duration. Each spectrogram chunk is tokenized as an audio token through an image-based tokenizer.

Thus, the ML computer model(s) receive, as input, dual-modal tokens comprising audio and text, where the audio portion comprises the audio tokens generated from the spectrogram chunks and the textual portion comprises the text tokens generated from the user's spoken command. The dual-modal (audio and text) tokens share the same (one-hot encoding) embedding space. The trained ML computer model(s) can take in a dual-modal (text and audio tokens) sequence, and then generate text tokens of a templated text sentence one by one including the indices of the beginning and ending spectrogram chunks in the input audio-token sub-sequence. The two indices can be mapped to the corresponding beginning and ending timestamps of the expected audio clip based on the split points of spectrogram chunks on the timeline. The audio clip is a portion of the spectrogram that corresponds to the beginning and ending timestamps, e.g., a portion of a podcast, a portion of an audiobook, or other digital pre-recorded audio data which the user wishes to highlight and potentially store for later review, use, processing, etc.

The ML computer model(s) output a templated text sentence including the indices of two spectrogram chunks in the input audio-token sub-sequence, which are the beginning and ending spectrogram chunks of the expected audio clip in an input audio on a timeline of the spectrogram. The output templated text sentence may be input to an audio search and extraction engine which can then search the original input audio based on the predicted start_index and end_index, which can be mapped to beginning and ending timestamps of a corresponding segment in the input audio. Thus, the timestamps may be used to extract the portion of the original input audio between the start_index and end_index. The stored audio clip may then be replayed at a later time, converted to a textual version through speech-to-text conversion, or otherwise processed in accordance with the user's needs.

Thus, rather than having to manually manipulate a user interface of a computing device that is presenting an audio output of a digital pre-recorded audio data, e.g., a podcast, audiobook, or other computer data structure that presents audio output when processed, in order to highlight a portion of the audio that was presented to the user, such as by clicking on clickable timestamps or the like, the illustrative embodiments train one or more machine learning computer models of an AI computing tool to recognize spoken commands and map the attributes of those spoken commands to specific types of audio content and specific start and end time points of the audio data to thereby identify a portion of the audio data to highlight. This permits users to be able to highlight portions of audio data even in circumstances where they are unable to physically manipulate the playback computing device, such as when driving a vehicle, performing housework, or otherwise being engaged in activities where their physical capabilities are impaired, or their attention is split between listening to the audio and performing other activities.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As discussed above, the illustrative embodiments provide an artificial intelligence (AI) computer system comprising one or more machine learning trained computer models, that identify spoken commands and based on the spoken commands determine a portion of digital pre-recorded audio data that is to be highlighted. In the context of the present invention, the term "highlight" refers to the selection, extraction, and storage of a portion of content, from digital pre-recorded content data, for later retrieval, processing, and presentation to a user in the same or a different format. Such highlighting occurs during a playback of the digital pre-recorded content data to a user such that the spoken command may be received while the user is consuming the digital pre-recorded content data, e.g., listening to the podcast, listening to the audiobook, etc., and during real-time speaks a command in an attempt to capture a portion of content recently consumed, e.g., just heard by the user.

FIG. 1 is an example diagram illustrating an example operation of a content highlighting AI computer system in accordance with one illustrative embodiment. Again, for purposes of this description, the illustrative embodiments will be described in the context of audio data, but is not limited to such and can be implemented with regard to video and/or multi-media content data without departing from the spirit and scope of the present invention. The operation shown in FIG. 1 assumes that the machine learning computer model(s) of the content highlighting AI computer system 130 have been trained through a machine learning process on training data comprising dual-modal input features, e.g., a combination of text and audio spectrogram features, to learn an association of such dual-modal input features and spectrogram chunk indices. As a result, the machine learning computer model(s) of the content highlighting AI computer system 130 can predict, given an input set of dual-modal features of an input text and spectrogram, the start and end indexes of spectrogram chunks intended to be identified by a user's spoken command and generate a templated text output specifying the indices.

As shown in FIG. 1, for a digital pre-recorded audio data file, e.g., a cached audio data structure, a user 110 can use his/her voice to give a voice command 112 in the form of a templated sentence (e.g., "Query [last][three] sentences"). The user's spoken command 112 may be converted to a textual equivalent 122 via a speech-to-text (STT) algorithm 120. Input audio data 140 and the command (converted into an equivalent text 122 through speech-to-text algorithm 120) as dual-modal input is fed into one or more machine learning trained computer model(s) 132 of the content highlighting AI system 130 which identifies indices within the input audio data 140 corresponding to the user's spoken command. In some illustrative embodiments, the input audio data 140 may be converted to a spectrogram via a spectrogram conversion engine 138 which also segments the spectrogram into a plurality of segments or chunks of approximately equal size, e.g., equal time duration in the audio sequence represented in the input audio data. Each of these segments or chunks has a corresponding index, e.g., segment/chunk number, and associated timestamps to uniquely identify each segment/chunk within the sequence of segments/chunks in the segmented/chunked spectrogram.

In some illustrative embodiments, the one or more machine learning trained computer model(s) 132 may comprise one or more neural network computer models that operate on features extracted from the dual-modal input to correlate patterns of such features with predicted outputs of indices of segments or chunks of audio input data or timestamps within the audio input data. As such, the content highlighting AI system 130 may include a text tokenizer 134 and a per-chunk (or segment) image-based tokenizer 136 that extracts text and audio tokens which may be used as input features for the one or more ML trained computer model(s) 132. It should be appreciated that in illustrative embodiments where the input audio data is first converted to a spectrogram, the audio chunk tokens may comprise features of a portion of the spectrogram representing aspects of the original input audio data.

The model generates a templated text sentence, such as "Index from [start_index] to [end_index]", which includes the predicted beginning and ending positions in a segmented or chunked spectrogram of the input audio data, which may be mapped to related timestamps later, of the target audio clip to be highlighted or stored for later retrieval, processing, and presentation. That is, in some illustrative embodiments, the templated text sentence may be used by an audio playback computing device, a content access application executing on a computing device, or the like, to thereby retrieve and present the target audio clip corresponding to the start and end indices, or timestamps, within the input audio data. In some illustrative embodiments, the STT algorithm 120 may be used to convert any speech in the target audio clip to a textual equivalent for viewing by a user, such as via a user interface presenting notes or a transcript of the target audio clip. Hence, the user is able to speak a voice command and have that voice command understood by the content highlighting AI system 130 to automatically identify and store the desired portion of audio content, i.e., the target audio clip, for later retrieval, processing, and playback.

With the illustrative embodiments, there is no need to rely on any text version of the input audio data 140 itself, or text obtained through speech-to-text (STT) executed on the input audio data 140, in order to identify the target audio clip within the start_index and end_index. That is, the machine learning computer model(s) of the content highlighting AI computer system 130 operate based on patterns of dual-modal input features to thereby map those dual-modal input features to corresponding indices, rather than attempting to perform keyword matching between input text and textual versions of input audio data. Thus, the illustrative embodiments are able to operate on input audio data where there is no textual equivalent provided.

Figure 2:
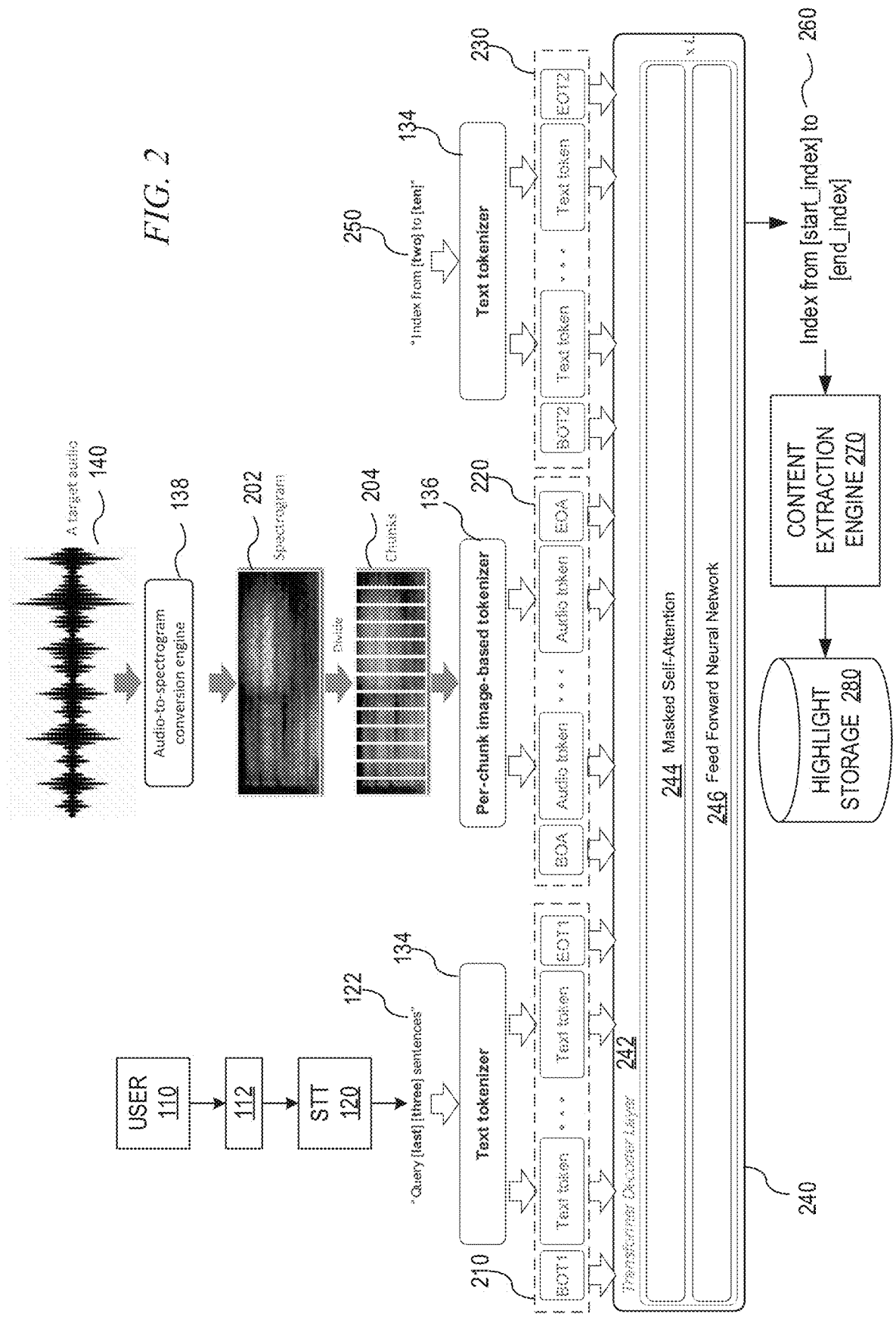
FIG. 2 is an example diagram of a content highlighting AI computer system in accordance with one illustrative embodiment.

FIG. 2 is an example diagram of a content highlighting AI computer system in accordance with one illustrative embodiment. Similar elements to those shown in FIG. 1 will be referenced in FIG. 2 with similar reference numerals for consistency.

As shown in FIG. 2, in some illustrative embodiments, the generation of the output textual command 260 with the specified indices involves a computer model 240, of the one or more machine learning computer models 132 of the content highlighting AI computer system 130, employing a decoder layer 242 for auto-regressive language modeling with support for very long sequences. One illustrative embodiment adopts a unidirectional Transformer-XL Decoder, which has L layers and many attention heads, where each layer includes a Masked Self-Attention Layer 244 and a Feed Forward Neural Network 246. The computer model 240 takes in a dual-modal sequence comprising a templated text sentence 122 (converted from a user's voice command 112 by the speech-to-text (STT) algorithm 120), which is tokenized by a text tokenizer 134 to form a text-token sequence 210, and input audio data 140 in which an audio clip is to be highlighted.

As shown in FIG. 2, the input audio data 140 is converted to a spectrogram 202 through the audio-to-spectrogram conversion engine 138 The resulting spectrogram 202 is divided by the audio-to-spectrogram conversion engine 138 into small segments or chunks with a similar size or duration (e.g., t milliseconds). Each spectrogram segment/chunk is then input to the per-chunk (segment) image-based tokenizer 136 which tokenizes the spectrogram segments/chunks into corresponding audio tokens 220 comprising a small portion of the segment/chunk of the spectrogram. The image-based tokenizer 136 categorizes/classifies the image feature(s) of a spectrogram chunk, and generates a converted audio token that corresponds to the classified feature category of the spectrogram chunk. Text-based and image-based tokenizers are generally known in the art and thus, a more detailed explanation is not provided herein. Any known or later developed tokenizer for image data may be used without departing from the spirit and scope of the present invention.

Thus, the computer model 240 receives, as input, a dual-modal sequence composed of a templated text sentence converted from the user's voice command, tokenized to form a text-token sequence, and an audio token sequence generated from a spectrogram of an input audio data, from which a portion is to be highlighted, which has been converted to a spectrogram and segmented into segments/chunks. The computer model 240 is trained via a machine learning training process to perform a left-to-right token prediction, also known as an auto-regressive language modeling training, which given a current token sequence predicts the next token in the sequence. As shown in FIG. 2, during a training operation, the input comprises the text tokens 210 of the input textual command 122, the audio tokens 220 of the input audio data 140, and a target output text 250 which is tokenized by the text tokenizers 134 to generate text tokens 230 for the target output text 250. These text tokens 230 serve as a ground truth for training purposes such that the model 240 generates a candidate text token sequence for a candidate output text specifying indices for beginning and endings of the portion of audio to be highlighted, which is then compared to the ground truth to determine an error or loss. The error/loss is then used by the machine learning logic to modify operational parameters of the model 240 to minimize this error or loss.

In some illustrative embodiments, during training, each combination of the three token sequences 210, 220 and 230 from the prebuilt training dataset (see discussion of FIG. 3 hereafter) can be considered as a concatenated long token sequence (similar to a text sentence, where the training dataset is similar to a large corpus). Assume this long token sequence is referred to as $\mathcal{U} = \{u_1, \ldots, u_m\}$, wherein $u_i$ is a text/audio/separator token and m is the length of the long token sequence. In this case, the training uses an autoregressive language modeling objective to maximize the following likelihood:

$$L_1(\mathcal{U}) = \sum_i \log P(u_i \mid u_{i-k}, \ldots, u_{i-1}; \theta)$$

where k is the size of the context window (e.g., if i=3, k=2), and the conditional probability P is modeled using a neural network with parameters $\theta$ (e.g., a multi-layer unidirectional Transformer-XL decoder; in FIG. 2 the computer model 240 adopts L layers). Those parameters are trained using stochastic gradient descent. The computer model 240 applies a multi-headed self-attention operation over the input token sequence followed by position-wise feedforward layers to produce an output distribution over target tokens:

$$h_0 = UW_e$$

$$h_l = \text{transformer\_block}(h_{l-1}) \, \forall \, i \in [1, n]$$

$$P(u) = \text{softmax}\left(h_n W_e^T\right)$$

where $U = (u_{-k}, \ldots, u_{-1})$ is the context vector of tokens, n is the number of layers, We is the token embedding matrix. Each $P(u_i)$ is a probability distribution and can be mapped to a one-hot encoding embedding as a predicted token. For example, suppose one-hot encoding embedding is a three-dimensional vector and $P(u_i) = (0.1, 0.8, 0.1)$, then the mapped token is (0, 1, 0) according to the dimension whose probability value (e.g., 0.8) is highest. Based on the input token sequence and the predicted token sequence, the corresponding loss is calculated, such as a cross entropy loss.

The model 240 is trained through the machine learning process to output templated text sentences that include the indices of the beginning and ending spectrogram segments/chunks in the audio-token sequence 220 of the input audio data 140 that the user wants to highlight. This learning causes the model 240 to predict, based on the input text token sequence 210 of the user's spoken command 112 converted to text 122 via the STT engine 120, and the audio token sequence 220, which portion of the audio-token sequence 220 the user's spoken command 112 is specifying to highlight. The token sequences 210-230 have separator tokens "BOT1", "EOT1", "BOA", "EOA", "BOT2", and "EOT2", where BOT 1 is the beginning of input text, EOT1 is the end of input text, BOA is the beginning of audio, EOA is end of audio, BOT2 is beginning of output text, and EOT2 is the end of the output text. These separator tokens serve as boundaries to the different portions of the token sequence for each of the input text, the audio input, and the text output. The audio, text, and separator tokens share the same, e.g., one-hot encoding, embedding space with text and separator tokens ranging from 0 to M and audio tokens ranging from M+1 to M+K. The whole input token sequence may be padded to achieve a desired size.

Thus, with the illustrative embodiments, the same embedding space can differentiate between text/separator tokens and audio tokens. For example, suppose there are two very small embedding spaces. In the first embedding space, the token indices of text tokens are 0~1, and corresponding one-hot encoding text embeddings are (1,0) and (0,1). In the second embedding space, the token indices of audio tokens are also 0~1, and corresponding one-hot encoding audio embeddings are also (1,0) and (0,1). If a probability distribution $P(u_i)$ output from the model is (0.2, 0.8), then the model does not know to map the output to the text embedding (0,1) or the audio embedding (0,1).

However, with the mechanisms of the illustrative embodiments, the embedding space differentiates between these two potential embeddings using the hyperparameters M and K, such that the model knows whether to map to the text or the audio embedding. M is the total number of text and separator tokens, and K is the total number of feature categories of spectrogram chunks. To set M, it is determined by the number of the used text tokens (words) in the defined templated text sentences/commands, and the number of the used separator tokens. Expert experience in conjunction with ablation experiments can be adopted to obtain a best K value, and generally a very large number is recommended.

The machine learning training of the model 240 may involve correlating specific features, e.g., token sequences 210, of the user's spoken command 112 with indices of a segmented and tokenized spectrogram of audio data, e.g., tokens 220. For example, these specific features may include identifiers of content type which are correlated with a particular portion of audio, specific recognizable keywords to portions of audio, specific numbers of elements, e.g., words, sentences, etc., with portions of audio, specific designations of temporal attributes in the commands to portions of audio, and/or the like. This learning can be done with free-form commands in which language modeling and/or natural language processing may be applied to extract such features from the free-form commands. However, in some illustrative embodiments, to make such learning more accurate and efficient, the model 240 may be trained based on a specified vocabulary of templated commands that the user may speak.

For example, in some illustrative embodiments, three templated command sentences are provided that the user can use to input commands to highlight portions of audio input. It should be appreciated that a single model 240 may be trained to recognize features of all three of these different types of commands, or in other illustrative embodiments, there may be a separate model 240 trained for each templated command. Moreover, in some illustrative embodiments, other templated commands may be used in addition to or in replacement of the example templated commands described herein.

In one illustrative embodiment, the three templated command sentences that the users can use to highlight audio include "Query [last|current] [content_type]", "Query [N] sentences centered on [keyword] in [last|current] [content_type]", and "Query [last|current] [N] sentences." In each of these examples, the values in brackets represent attributes or features of the commands that may be correlated with portions of audio. Again, these are only examples and are not intended to limit the types of commands that may be utilized, whether free-form or templated.

In the examples above of the illustrative embodiments, the template parameter "content_type" can be one of verbal and non-verbal audio categories. For example, for verbal audio categories of content_type, this content type includes, but is not limited to the audios composed of language and their subject categories (e.g., dialogue, novel, poem, or the like), and can be differentiated and identified from the perspective of text semantics. For example, taking 304 in FIG. 3, as described hereafter, the content_type may be a poem in text format. This poem is composed of language and its category (that is, poem) can be differentiated and identified from the perspective of text semantics, by using text classification technologies such as DLA, or deep learning classifiers. When building training dataset, text documents of different subject categories are collected, like a poem in text format. Generally, the collecting source that provides those text documents may annotate the correct subject categories for those text documents already. If several collected text documents are not annotated with subject categories by their respective collecting sources, before starting TTS 310 operation, existing text classification technologies may be utilized to identify the related subject categories at first. During training or inference, the input audio (e.g., a podcast host reading a poem and then a fairy tale to form a verbal audio) is fed into the model but may not need to identify content types.

For non-verbal categories of content type, these audio categories may include different music categories, such as symphony, blues, jazz, etc. It should be appreciated that for audio categories in non-verbal, users can only use the first templated command sentence example above "Query [last-|current] [content_type]". For audio categories in verbal, users can use all three templated command sentences in the examples above.

The illustrative embodiments also define a templated text sentence, e.g., "Index from [start_index] to [end_index]", as the computing model 240 output. If the audio clip that a user wants to highlight does not exist in an input audio 140, the generated text sentence output by the computing model 240 may set the start_index and end_index to a special text token [unknown], for example.

Thus, during training, the model 240 is presented with many different multi-modal token sequence inputs, comprising different ones of token sequences 210 and 220, as well as ground truth token sequences 230, to thereby train the model 240 to predict an output token sequence, similar to the ground truth token sequences 230, given a multi-modal input token sequence 210, 220. The training dataset comprises a plurality of such examples of input token sequences 210, 220 and corresponding ground truth target output sequences 230 such that the machine learning training executes a plurality of iterations or epochs of machine learning training to minimize the error or loss of predictions generated by the model 240 by iteratively adjusting the operational parameters of the model 240 such that the model 240 generates more accurate predictions. This process continues until the error/loss falls to equal or below a given threshold acceptable level of error/loss or until a predetermined number of iterations/epochs of machine learning training have occurred. At this point, the model is considered to have converged and may be tested to ensure acceptable performance, and assuming that there is acceptable performance, may be deployed for runtime operation on new input user commands and audio.

During runtime operation, the content highlighting AI computing system comprising the trained machine learning computer model 240 receives the spoken command 112 from the user 110, converts the commend to a text form using STT engine 120, and then tokenizes the textual command 122 via text tokenizer 134 into a text token sequence input 210. Then, at substantially a same time, the content highlighting AI computing system receives an audio input 140 which is converted to a spectrogram 202 and then divided into a sequence of spectrogram chunks/segments 204 by the audio-to-spectrogram conversion engine 138, and then is tokenized into audio tokens on a per-segment or per-chunk basis, to thereby generate audio token sequence input 220. Thus, the input is a multi-modal input comprising token sequences 210 and 220. The trained machine learning computer model then automatically generates an output text 260 comprising a text token sequence corresponding to a templated text output, such as "Index from [start_index] to [end_index]" where start_index and end_index are populated based on the trained model 240 correlation of the input text token sequence features with a portion of the audio tokens in the audio token sequence 220, e.g., index from [seventy] to [eighty] indicating that audio tokens 70-80 are to be highlighted.

The output textual sentence may then be stored for later retrieval, or input to a content extraction engine 270 that extracts the specified portion of audio content corresponding to the audio token sequence 220 by selecting the portion of the original input audio having timestamps corresponding to the start_index and end_index of the audio token sequence 220. Thus, the audio tokens from seventy to eighty, in the above example, may be extracted and the start_index and end_index correlated to timestamps in the original input data to thereby extract the portion of audio corresponding to the audio token sequence 220. The resulting audio portion may be stored in an audio data structure of a highlight storage 280 for future retrieval, processing, and presentation to the user.

Figure 3:
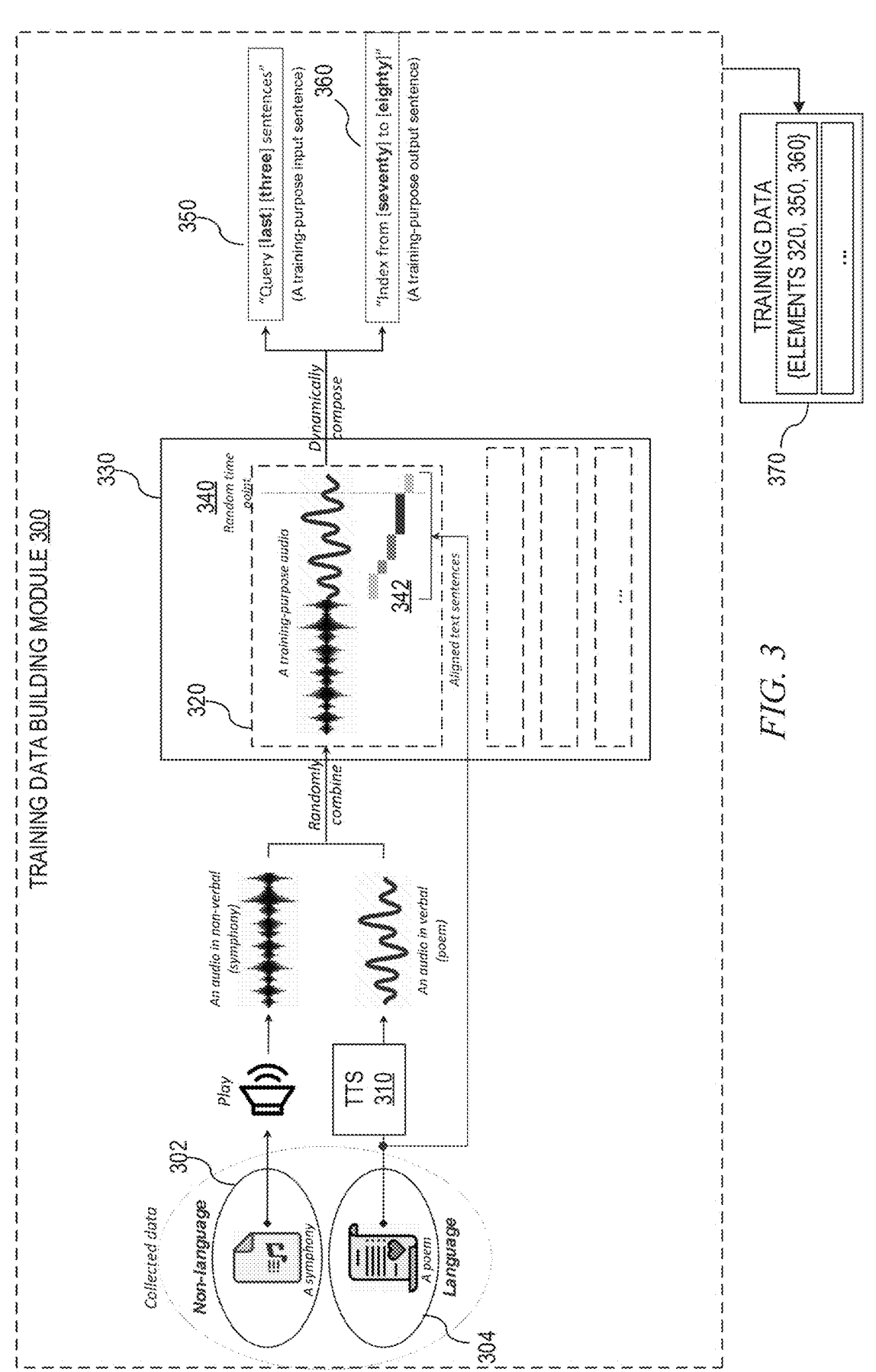
FIG. 3 is an example diagram of a process for compiling a multi-modal training data for training one or more machine learning computer models of a content highlighting AI computer system in accordance with one illustrative embodiment.

As mentioned above, the machine learning computer model(s) 240 of the content highlighting AI computer system are trained on multi-modal input training data to process multi-modal data and automatically generate a textual output specifying the indices of the start and end portion of content to be highlighted, i.e., the range of audio tokens and/or segments or chunks of the input audio data that is to be extracted and stored for highlighting to the user. FIG. 3 is an example diagram of a process for compiling a multi-modal training data for training the one or more machine learning computer models 240 of the content highlighting AI computer system in accordance with one illustrative embodiment. The operation outlined in FIG. 3 may be performed, for example, by a computer implemented training data building module 300.

As shown in FIG. 3, various verbal and non-verbal data structures (audios) 302, 304 are collected by the training data building module 300 from various source computing and/or data storage systems (not shown). The non-verbal audios 302 represent musical composition, noises, or the like, that are not represented in spoken languages, e.g., symphonies, blues music, jazz music, sound effects, and the like. The verbal data structures 304 may be provided, for example, as textual data, which is then converted to an audio data structure using a text-to-speech (TTS) engine 310 or the like. The resulting verbal audios may comprise various audio representing spoken language, such as poems, novels, dialogue, and the like. These audios 302, 304 may comprise metadata that specifies classifications of the audios, such as music genres, type of composition that the verbal audio represents, e.g., a poem, a novel, a dialogue, etc. This metadata may be used to assist in learning category_type attribute mappings to indices of input audio content.

From the collected verbal and non-verbal data structures (audios) 302, 304, one or more are selected, such as via a random or pseudo-random process, and are combined. That is, the audio version of the verbal data structure 304 generated through the TTS engine 310 execution, may be combined with a non-verbal audio through a playback of both audios to generate a multi-modal training data 320 comprising both verbal and non-verbal audio data (audios). This process may be repeated for various combinations of selected audios from the collected audios so as to build a training dataset 330 of audios.

The combination of the audios is random. A training-purpose audio can include just one audio, that is, no combination of multiple audios, or a training-purpose audio can combine (concatenate) multiple (≥2) verbal or non-verbal audios in a random order. Any two audios combined into an audio do not overlap on the timeline. Sometimes, a portion of a verbal audio (using sentence as the granularity) is used to be combined with other audios or a portion of a non-verbal audio is also used to be combined with other audios.

When performing the training of the machine learning computer model, a training audio 320 is selected from the training dataset 330 and a random time point 340 in the selected training audio is determined. The random time point 340 simulates a point in time when a user may be hearing the playback of the selected audio, i.e., a listing point 340. An input query 350 is dynamically and automatically generated based on this randomly selected time point, e.g., "Query [last][three] sentences". The attributes of the input query 350 may be randomly set or specifically selected. In the case of training data comprising non-verbal audios, the metadata specifying the classification of the non-verbal audios, e.g., symphonies, blues, jazz, or the like, may be used to populate the content_type attribute of the input query, for example. In some cases, with training audios having a verbal audio, the same can be done for content_type for verbal audios as well.

In addition, input queries that comprise attributes that correspond to non-existent audio clips in the selected training data may be composed. For example, if the selected training data does not include any jazz music, an input query may be generated that queries for jazz music, e.g., "Query [last][jazz]", to thereby train the machine learning model to recognize instances where the content to be highlighted is not actually present in the input audio content.

Thus, each selected training data 320 has a corresponding set of one or more randomly generated input queries 350, representing the types of queries that a user may speak when listening to the audio at a point in time represented by the randomly selected time point. Based on the current listening point 340 (within the scope of a verbal sub-audio) and combined training-purpose audio 320, the training data building module 300 may build a random and valid input sentence, e.g., "Query [last] [three] sentences". Then, to build a corresponding output sentence, the training data building module 300 determines the start_index and end_index of the corresponding three sentences. Thus, the training data building module 300 converts the combined audio into a spectrogram-chunk sequence (each chunk duration is t milliseconds). With the aligned text sentences of the verbal sub-audio, the training data building module 300 identifies the last three sentences (that is, the sentences represented as bars 342 in FIG. 3). Then, based on the original time durations and the combination order of the non-verbal and verbal two sub-audios, and the alignment points of the text sentences on the timeline, the training data building module 300 determines the spectrogram-chunk index as start_index which corresponds to the beginning of the first bar, and the spectrogram-chunk index as end_index which corresponds to the ending of the last bar prior to the listening point 340, in the depicted sequence of bars 342. Thus, the training data building module 300 builds an output sentence "Index from [seventy] to [eighty]". Finally, the training data building module 300 makes a new copy of the training-purpose audio and saves the former part of the copied audio before the listening point, together with "Index from [seventy] to [eighty]" and "Query [last] [three] sentences", as one training data because the three are now correlated.

Thus, through this process, a training dataset 370 is composed and stored, where the entries in the training dataset comprise the generated multi-modal input audio data 320, an input query (or user command) 350, and a corresponding ground truth output text 360 specifying the indices for the beginning and ending indices of a portion of audio content corresponding to the attributes of the input query 350. Each multi-modal input audio data 320 may have multiple entries, depending on the number of input queries and randomly selected listening points used. Multiple different multi-modal input audio data 320 may be represented in the training dataset. During training of the machine learning computer model, the entries in the training dataset are input to the machine learning computer model which generates predictions of the output text, including the beginning/ending indices, which is then compared to the ground truth of the entry and an error/loss is calculated. The machine learning logic then modifies the operational parameters of the machine learning computer model so as to reduce this error/loss in subsequent iterations/epochs. This process continues until the model converges, as discussed above.

Thus, as an example, when building a training data (taking FIG. 3 as an example), the training-purpose audio may be sequentially composed of the symphony audio and a poem audio. Based on the current listening point 340 and combined audio, a training data building module 300 can build a random and valid input sentence like "Query [last] [symphony]". Then, to build a corresponding output sentence, the training data building module 300 needs to determine the start_index and end_index of the symphony audio. Thus, the training data building module 300 first converts the combined audio into a spectrogram-chunk sequence (each chunk duration is also t milliseconds) and then, based on the original time durations and the combination order of the symphony and poem audios, the training data building module 300 can determine the start_index (e.g., equal to 0) and end_index (e.g., equal to 50) of the symphony audio's sub-spectrogram-chunk-sequence. Thus, the correlation occurs during building of the training dataset.

During training, the prebuilt training data (the combined audio, input sentence "Query [last] [symphony]" and output sentence "Index from [zero] to [fifty]") are converted to three token sequences 210, 220 and 230 (see FIG. 2). After trained with massive and diverse combined audio (including one or more different symphony audios) from training dataset, the machine learning trained computer model 240 can predict the start_index and end_index of other (symphony) audio tokens based on the text and spectrogram-chunk features carried by input token sequences 210 and 220, through predicted probability distribution, based on the learned language model implemented by the machine learning trained computer model 240.

Thus, with the mechanisms of the illustrative embodiments, users can directly use voice commands and obtain the relevant audio clips precisely captured in time from the target audio/video content. This provides an improved user experience for highlighting audios or videos to capture, store, retrieve, process, and present useful information. This is especially helpful in situations where a user is consuming content while engaged in other activities that present them physically manipulating computing devices or playback devices used to present the consumed content. The illustrative embodiments may be used in various applications with the capability of audio/video play and can be integrated into various audio/video computing devices, applications, or other products or services that are used to present and capture portions of audio/video content. For example, computing devices and/or applications/services that are used to present podcasts, audiobooks, and the like, may be augmented to include the mechanisms and functionality of the illustrative embodiments.

As described above, the illustrative embodiments of the present invention are specifically directed to an improved computing tool that automatically determines portions of content that correspond to a user's spoken command for content highlighting. All of the functions of the illustrative embodiments as described herein are intended to be performed using automated processes without human intervention. While a human being, e.g., a user, may initiate the operation of the mechanisms of the illustrative embodiments by providing a spoken command or query, the illustrative embodiments of the present invention are not directed to actions performed by the user, but rather logic and functions performed specifically by the improved computing tool on the audio/video or multi-media content based on the user's spoken commands/queries. Moreover, even though the present invention may provide an output of a text specifying indices of a highlighted portion of content and/or the highlighted portion of content itself, which may ultimately assists human beings in selecting portions of content to be highlighted, stored, processed, and presented, the illustrative embodiments are directed to the automated improved computing tools that facilitate such operations, and the functionality of these automated improved computing tools in facilitating such operations. Thus, the illustrative embodiments are not organizing any human activity, but are in fact directed to the automated logic and functionality of an improved computing tool.

Thus, the illustrative embodiments provide an improved computing tool and improved computing tool operations that facilitate identification of the bounds of a portion of content of interest to an individual, i.e., a portion of content to highlight, based on their spoken queries or commands. The illustrative embodiments automatically, through artificial intelligence comprising a machine learning trained computer model, locate the specific time range in the pre-recorded digital content that is of interest to the individual and automatically converts the content to a highlight data structure, e.g., multi-media snippet, textual conversion of audio content, and/or the like, so that the highlighted content may be stored as a customized selection of a portion of the pre-recorded digital content for later access by the individual.

While the above description provides an overview of software, hardware, and the configuration of such software, hardware, and such to implement various "engines", it should be appreciated that any references to generic computing hardware is intended to refer to merely the hardware itself in cases where the hardware is not modified. However, even if, in some embodiments, generic computing hardware is used as a basis, the invention is not in the generic computing hardware, but rather the specifically configured software and hardware mechanisms that, only through such specific configuration, permit the described inventive computer tool functionalities to be realized. That is, for a computing tool to provide improved or inventive computing tool functionality, the computing tool relies on a combination of hardware and software that together define the improved computing tool functionality, unless new hardware is specifically described that hard wires this specific configuration into a new arrangement of circuitry. Hence, even in embodiments where the "engines" are implemented in software executing on computer hardware which configures that computer hardware to perform the particular improved computing tool functionalities of the embodiment, the embodiment is describing an improved computer functionality and improved computing tool and not an abstract idea for which computers are merely used as a tool. The embodiments described herein are not directed to any abstract idea of the invention, but rather to a practical application of an improved computing tool and improved computing tool functionality.

Figure 4:
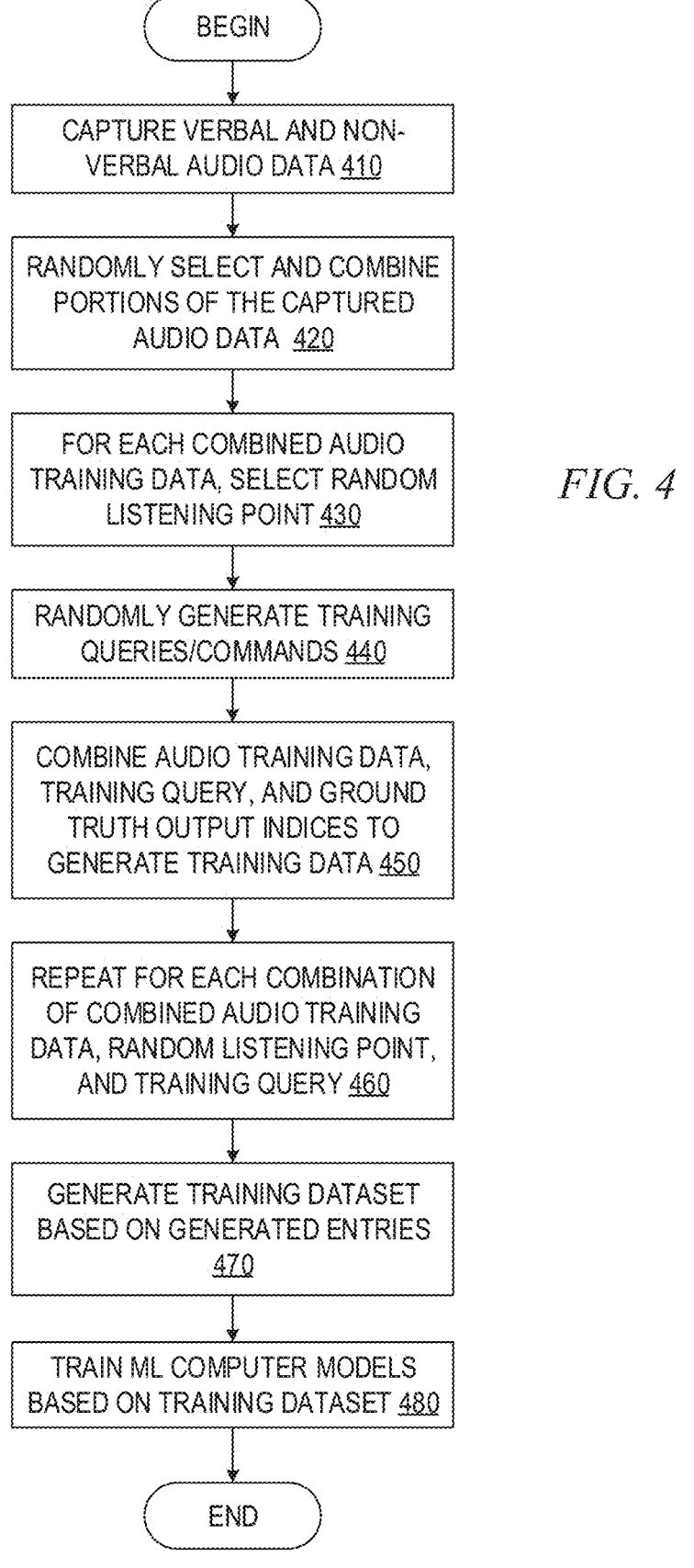
FIG. 4 is a flowchart outlining an example operation for training a machine learning computer model of a content highlighting AI computer system in accordance with one illustrative embodiment.
Figure 5:
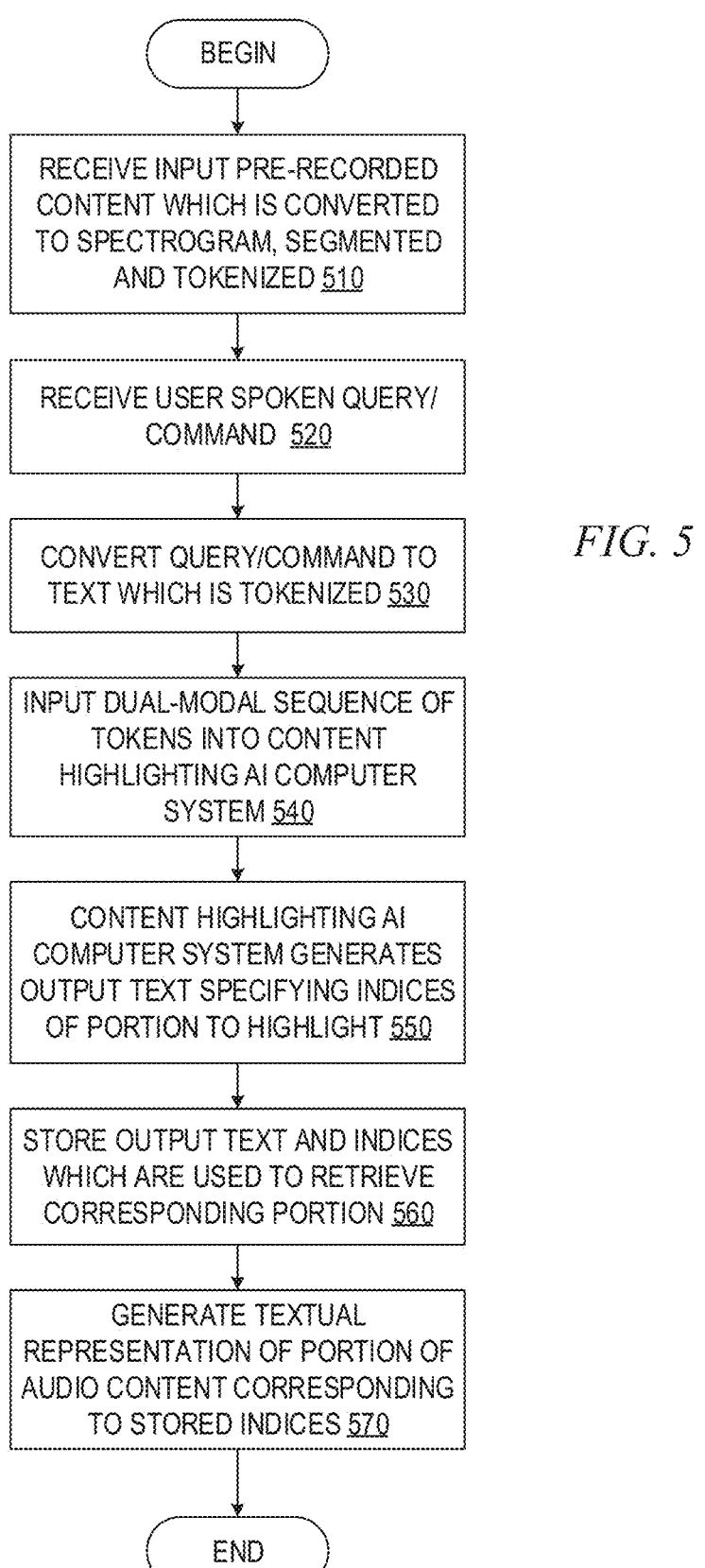
FIG. 5 is a flowchart outlining an example operation for performing automated content highlighting in accordance with one illustrative embodiment.

FIGS. 4-5 present flowcharts outlining example operations of elements of the present invention with regard to one or more illustrative embodiments. It should be appreciated that the operations outlined in FIGS. 4-5 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 4-5, and may, in some cases, make use of the results generated as a consequence of the operations set forth in FIGS. 4-5, the operations in FIGS. 4-5 themselves are specifically performed by the improved computing tool in an automated manner.

FIG. 4 is a flowchart outlining an example operation for training a machine learning computer model of a content highlighting AI computer system in accordance with one illustrative embodiment. As shown in FIG. 4, the operation starts by capturing verbal and non-verbal audio data (step 410). Portions of the captured verbal and non-verbal audio data are randomly selected and combined to generate combined audio training data (step 420). For each combined audio training data, a random listening point is selected (step 430) and one or more training queries or user commands are randomly generated (step 440). The combined audio training data, ground truth output indices, and training query are correlated to generate a training data (step 450). This operation may be repeated for each combination of combined audio training data, random listening point, and training query/user command (step 460) after which the training dataset is composed of entries for each combination (step 470). The training dataset is then used as input to the machine learning training to train one or more machine learning computer models of a content highlighting AI computer system where the combined audio training data and training queries, are input to the machine learning computer model(s) which generate a predicted output text based on a processing of these inputs and which is compared to the ground truth to determine a loss (or error) and train the machine learning computer model to minimize this loss (step 480). The operation then terminates.

FIG. 5 is a flowchart outlining an example operation for performing automated content highlighting in accordance with one illustrative embodiment. The operation starts by receiving an input pre-recorded content, such as an audio content, which contains a portion that a user wishes to highlight, which is converted to a spectrogram, segmented, and then tokenized (step 510). The pre-recorded content may be part of a session in which a user is listening or viewing the pre-recorded content via a computing device or other playback device, for example. At some point while consuming the content, the user may speak an input query or user command (step 520). The input query/user command is converted to a textual format with specified attributes and tokenized (step 530) and input to the content highlighting AI computer system along with the received input pre-recorded content (step 540). The content highlighting AI computer system processes the combination of the input user query/command and the content to generate an output text specifying the indices of the start and end portion of the content that corresponds to the attributes of the input user query/command, i.e., the portion to be highlighted (step 550). The output text and indices may be mapped to beginning and ending timestamps in the content and used to retrieve the identified portion of content which may be stored for later retrieval, processing, and presentation (step 560). The operation can terminate at step 560, but in some illustrative embodiments, additional operations may be performed on the identified portion of content in accordance with a specific use case (step 570). For example, in some illustrative embodiments, a textual version of the identified portion of content may be automatically generated via a speech-to-text (STT) conversion, and stored for later retrieval, so as to store textual notes corresponding to the selected portion. Other subsequent operations and computer processing of the identified portion of content may be performed without departing from the spirit and scope of the present invention.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a content highlighting artificial intelligence computing tool. The improved computing tool implements mechanism and functionality, such as the content highlighting AI computer system 130 in FIG. 1, which cannot be practically performed by human beings either outside of, or with the assistance of, a technical environment, such as a mental process or the like. The improved computing tool provides a practical application of the methodology at least in that the improved computing tool is able to automatically select a portion of content being consumed by a user without requiring the user to physically manipulate the computing device or playback device being used present the content to the user. This allows the illustrative embodiments to be used in situations where the user is engaged in activities that prevent the user from performing such physical manipulations, while still achieving the user's desired result of highlighting a portion of content.

Figure 6:
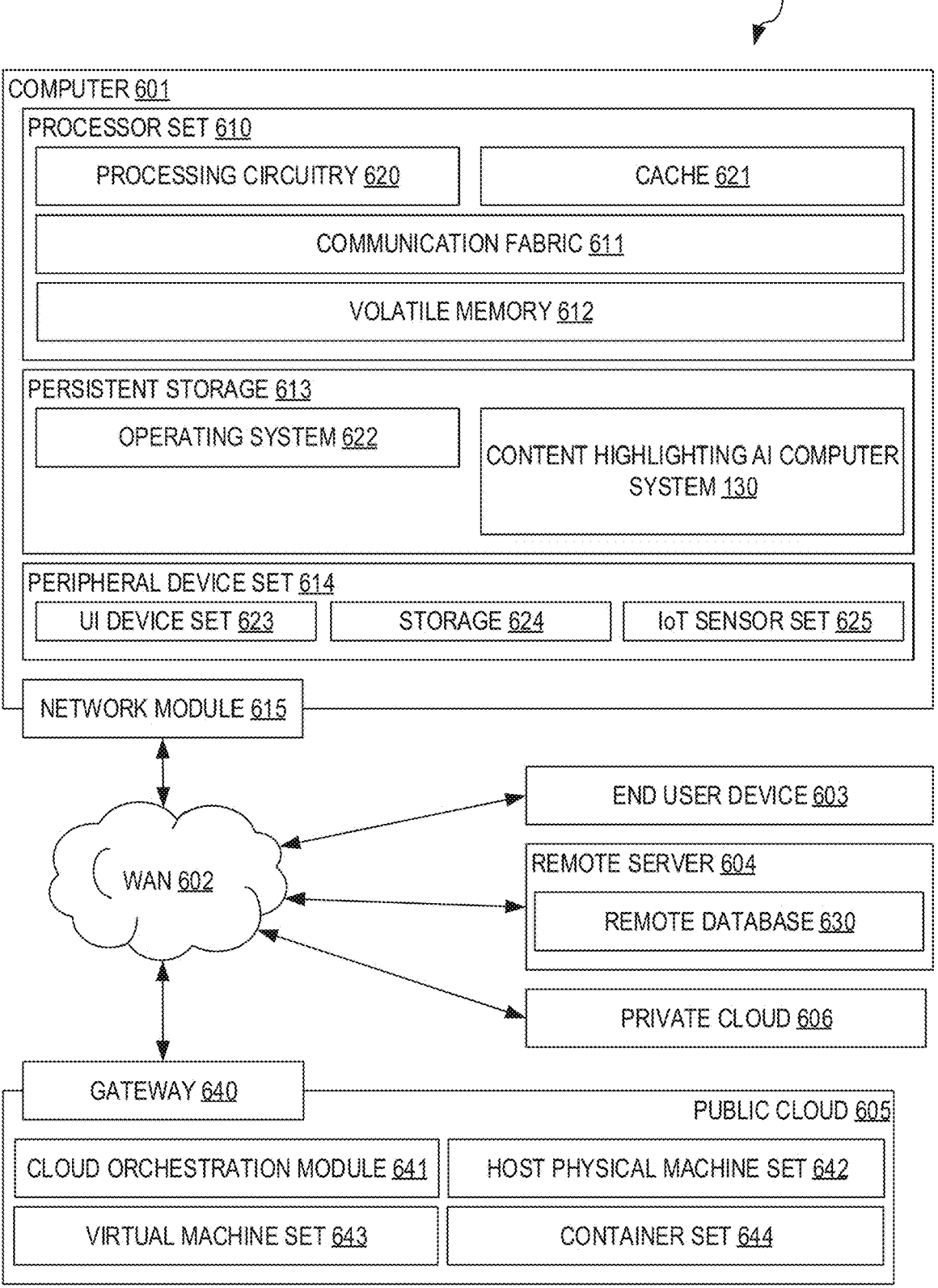
FIG. 6 is an example diagram of a distributed data processing system environment in which aspects of the illustrative embodiments may be implemented and at least some of the computer code involved in performing the inventive methods may be executed.

FIG. 6 is an example diagram of a distributed data processing system environment in which aspects of the illustrative embodiments may be implemented and at least some of the computer code involved in performing the inventive methods may be executed. That is, computing environment 600 contains an example of an environment for the execution of at least some of the computer code involved in performing the inventive methods, such as content highlighting AI computer system 130 in FIG. 1. In addition to block 130, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 200, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 200 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 200 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

As shown in FIG. 6, one or more of the computing devices, e.g., computer 601 or remote server 604, may be specifically configured to implement a content highlighting AI computer system 130. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 601 or remote server 604, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated and intelligent understanding of audible user commands and selection of a portion of content corresponding to these user commands for highlighting and storage for later retrieval, processing, and presentation.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

training a machine learning computer model on a dual-modal input sequence comprising target content data and an input user query specifying attributes for locating a portion within the target content data, and wherein the machine learning computer model is trained to process one or more audio tokens corresponding to a sequence of spectrogram chunks associated with the target content data and one or more text tokens associated with the input user query and output an output text specifying start and end indices associated with the sequence of spectrograph chunks and corresponding to the portion within the target content data;

receiving runtime content data and a user spoken query comprising attributes directed to identifying a section of the runtime content data;

processing the runtime content data and user spoken query via the trained machine learning computer model to generate an output text specifying a predicted beginning index and predicted ending index within the runtime content data;

retrieving a portion of the runtime content data corresponding to a range of runtime content data bounded by the predicted beginning index and predicted ending index, inclusively; and storing the retrieved portion in a data storage for later retrieval and processing.

2. The computer-implemented method of claim 1, wherein training the machine learning computer model comprises:

converting the target content data to the sequence of spectrogram chunks;

converting each spectrogram chunk to the one or more audio tokens;

converting the input user query to the one or more text tokens;

processing the sequence of one or more audio tokens corresponding to spectrogram chunks in the sequence of spectrogram chunks, along with the one or more text tokens of the input user query, to generate an output prediction of a first index and a second index, of spectrogram chunks in the sequence of spectrogram chunks;

comparing the first index and second index to a ground truth set of indices; and modifying operational parameters of the machine learning computer model to reduce an error between the first index and second index and the ground truth, to thereby train the machine learning computer model to predict a starting index and an ending index for a portion of content based on a dual modal input of text tokens from an input user query and audio tokens from a spectrogram of input target content data.

3. The computer-implemented method of claim 1, wherein the input user query is a templated input query from a plurality of predetermined templated input queries, and wherein the machine learning computer model learns, for each templated input query in the plurality of predetermined templated input queries, first spectrogram chunks and second spectrogram chunks of a plurality of spectrogram chunks corresponding to the templated input query.

4. The computer-implemented method of claim 3, wherein the plurality of predetermined templated input queries comprise a first input query to identify a last or current content type relative to a current listening time point, a second query to identify a number of sentences centered on a specified keyword in the target content data, or a third query to retrieve a specified number of language elements prior to the current listening time point.

5. The computer-implemented method of claim 1, wherein retrieving a portion of the runtime content data corresponding to the range of runtime content data bounded by the predicted beginning index and the predicted ending index comprises mapping the predicted beginning index to a first timestamp of the runtime content data and mapping the predicted ending index to a second timestamp of the runtime content data.

6. The computer-implemented method of claim 1, wherein processing the user spoken query via the trained machine learning computer model comprises converting the user spoken query to a first textual representation data structure by executing speech-to-text conversion, and processing the first textual representation data structure via the trained machine learning computer model to generate the output text.

7. The computer-implemented method of claim 1, wherein storing the retrieved portion in the data storage for later retrieval and processing further comprises executing speech-to-text conversion to generate a second textual representation data structure corresponding to content of the retrieved portion and storing the second textual representation data structure in association with the retrieved portion in the data storage.

8. The computer-implemented method of claim 1, wherein generating the output text comprises generating a templated text sentence which includes the predicted beginning index and predicted ending index, each index corresponding to a spectrogram chunk in the sequence of spectrogram chunks.

9. The computer-implemented method of claim 1, wherein the target content data comprises pre-recorded digital data of at least one of a podcast or a digital audio book, and wherein the retrieved portion is a portion of the podcast or digital audio book that is to be highlighted.

10. The computer-implemented method of claim 1, wherein the target content data is audio data.

11. A computer program product comprising a computer readable storage medium having a computer readable program stored therein, wherein the computer readable program, when executed on a computing device, causes the computing device to:

train a machine learning computer model on a dual-modal input sequence comprising target content data and an input user query specifying attributes for locating a portion within the target content data, and wherein the machine learning computer model is trained to process one or more audio tokens corresponding to a sequence of spectrogram chunks associated with the target content data and one or more text tokens associated with the input user query and output an output text specifying start and end indices associated with the sequence of spectrograph chunks and corresponding to the portion within the target content data;

receive runtime content data and a user spoken query comprising attributes directed to identifying a section of the runtime content data;

process the runtime content data and user spoken query via the trained machine learning computer model to generate an output text specifying a predicted beginning index and predicted ending index within the runtime content data;

retrieve a portion of the runtime content data corresponding to a range of runtime content data bounded by the predicted beginning index and predicted ending index, inclusively; and store the retrieved portion in a data storage for later retrieval and processing.

12. The computer program product of claim 11, wherein training the machine learning computer model comprises:

converting the target content data to the sequence of spectrogram chunks;

converting each spectrogram chunk to the one or more audio tokens;

converting the input user query to the one or more text tokens;

processing the sequence of one or more audio tokens corresponding to spectrogram chunks in the sequence of spectrogram chunks, along with the one or more text tokens of the input user query, to generate an output prediction of a first index and a second index, of spectrogram chunks in the sequence of spectrogram chunks;

comparing the first index and second index to a ground truth set of indices; and modifying operational parameters of the machine learning computer model to reduce an error between the first index and second index and the ground truth, to thereby train the machine learning computer model to predict a starting index and an ending index for a portion of content based on a dual modal input of text tokens from an input user query and audio tokens from a spectrogram of input target content data.

13. The computer program product of claim 11, wherein the input user query is a templated input query from a plurality of predetermined templated input queries, and wherein the machine learning computer model learns, for each templated input query in the plurality of predetermined templated input queries, first spectrogram chunks and second spectrogram chunks of a plurality of spectrogram chunks corresponding to the templated input query.

14. The computer program product of claim 13, wherein the plurality of predetermined templated input queries comprise a first input query to identify a last or current content type relative to a current listening time point, a second query to identify a number of sentences centered on a specified keyword in the target content data, or a third query to retrieve a specified number of language elements prior to the current listening time point.

15. The computer program product of claim 11, wherein retrieving a portion of the runtime content data corresponding to the range of runtime content data bounded by the predicted beginning index and predicted ending index comprises mapping the predicted beginning index to a first timestamp of the runtime content data and mapping the predicted ending index to a second timestamp of the runtime content data.

16. The computer program product of claim 11, wherein processing the user spoken query via the trained machine learning computer model comprises converting the user spoken query to a first textual representation data structure by executing speech-to-text conversion, and processing the first textual representation data structure via the trained machine learning computer model to generate the output text.

17. The computer program product of claim 11, wherein storing the retrieved portion in the data storage for later retrieval and processing further comprises executing speech-to-text conversion to generate a second textual representation data structure corresponding to content of the retrieved portion and storing the second textual representation data structure in association with the retrieved portion in the data storage.

18. The computer program product of claim 11, wherein generating the output text comprises generating a templated text sentence which includes the predicted beginning index and predicted ending index, each index corresponding to a spectrogram chunk in the sequence of spectrogram chunks.

19. The computer program product of claim 11, wherein the target content data comprises pre-recorded digital data of at least one of a podcast or a digital audio book, and wherein the retrieved portion is a portion of the podcast or digital audio book that is to be highlighted.

20. An apparatus comprising:

at least one processor; and at least one memory coupled to the at least one processor, wherein the at least one memory comprises instructions which, when executed by the at least one processor, cause the at least one processor to:

train a machine learning computer model on a dual-modal input sequence comprising target content data and an input user query specifying attributes for locating a portion within the target content data, and wherein the machine learning computer model is trained to process one or more audio tokens corresponding to a sequence of spectrogram chunks associated with the target content data and one or more text tokens associated with the input user query and output an output text specifying start and end indices associated with the sequence of spectrograph chunks and corresponding to the portion within the target content data;

receive runtime content data and a user spoken query comprising attributes directed to identifying a section of the runtime content data;

process the runtime content data and user spoken query via the trained machine learning computer model to generate an output text specifying a predicted beginning index and predicted ending index within the runtime content data;

retrieve a portion of the runtime content data corresponding to a range of runtime content data bounded by the predicted beginning index and predicted ending index, inclusively; and store the retrieved portion in a data storage for later retrieval and processing.

\* \* \* \* \*